(12) United States Patent
Cheng

(10) Patent No.: US 7,376,119 B2
(45) Date of Patent: May 20, 2008

(54) METHOD OF CONTROLLING DOWNLINK TRANSMISSION TIMING IN COMMUNICATION SYSTEMS

(75) Inventor: Fang-Chen Cheng, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 971 days.

(21) Appl. No.: 10/422,844

(22) Filed: Apr. 25, 2003

(65) Prior Publication Data
US 2004/0213199 A1    Oct. 28, 2004

(51) Int. Cl.
*H04J 3/06*    (2006.01)
(52) U.S. Cl. ..................................... 370/350
(58) Field of Classification Search ............ None
See application file for complete search history.

(56) References Cited

U.S. PATENT DOCUMENTS

2002/0105933 A1 * 8/2002 Higuchi ............... 370/338
2003/0048810 A1 * 3/2003 Kermade et al. ......... 370/503

OTHER PUBLICATIONS

Abraham et al., Effect of Timing Adjustment on Iub Link Capacity for Voice Traffic in W-CDMA Systems, IEEE, pp. 311-315, Sep. 2002.*
ARIB STD-T63-25.402 V4.5.0, Synchronization in UTRAN Stage 2 (Release 4), pp. 1-43, 2002.*
3G TS 25.415 V3.1.0, UTRAN Iu Interface User Plane Protocols, pp. 1-54, 2000.*

* cited by examiner

*Primary Examiner*—Frank Duong

(57) ABSTRACT

In a method of controlling downlink transmission timing at a radio network controller (RNC) in a communication system, a relative window is determined. The relative window represents a time difference between an arrival time of a data frame at the RNC from a core network, and a target transmission time for transmitting the data frame from the RNC to a Node-B. Boundary thresholds that adjoin the relative window are set, and a target arrival time that a data frame is to be received at the RNC is compared to the thresholds. The RNC may send a request to advance or retard sending of the data frame to the core network, depending on whether target arrival time of the data frame is outside one of the thresholds. A data frame received within the relative window is transmitted from the RNC to a Node-B.

18 Claims, 4 Drawing Sheets

METHOD OF CONTROLLING DOWNLINK TRANSMISSION TIMING IN COMMUNICATION SYSTEMS

BACKGROUND OF THE INVENTION

1. Field of the Invention

The present invention generally relates to controlling downlink transmission timing in communication systems.

2. Description of Related Art

An expanded effort is underway to support the evolution of the Universal Mobile Telecommunications System (UMTS) standard, which describes a network infrastructure implementing a next generation Wideband Code Division Multiple Access (W-CDMA) air interface technology. A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

One set of issues being addressed by the 3rd Generation Partnership Project (3GPP), a body which drafts technical specifications for the UMTS standard and other cellular technologies, includes UTRAN synchronization issues. The 3GPP technical specifications have attempted to address each of these issues. One of these issues is called time alignment handling. In the UMTS standard, time alignment handling is used to control downlink transmission timing at the CN nodes, in order to minimize buffer delay in a serving RNC (SRNC), which is an RNC serving one or more Node Bs. A time alignment handling procedure is controlled by the SRNC.

Although the current time alignment handling procedure for UMTS provides a procedure to control variable delay jitter conditions so as to provide a continuous information stream from the CN through the radio link to a UE, algorithms for triggering timing control and for controlling buffer capacity are not specified. Additionally, there is no mechanism in the time alignment handling procedure for controlling when a downlink transmission is to be transmitted.

SUMMARY OF THE INVENTION

Exemplary embodiments of the present invention are directed to a method of controlling downlink transmission timing at a radio network controller (RNC) in a communication system. In the method, a relative window is determined. The relative window represents a time difference between an arrival time of a data frame at the RNC from a core network, and a target transmission time for transmitting the data frame from the RNC to a Node-B. Boundary thresholds that adjoin the relative window are set, and a target arrival time for receipt of a data frame at the RNC is compared to the boundary thresholds. The RNC may send a request to advance or retard sending of the data frame to the core network, depending on whether target arrival time of the data frame is outside one of the thresholds. A data frame received within the relative window is transmitted from the RNC to a Node-B.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus do not limit the exemplary embodiments of the present invention and wherein.

DETAILED DESCRIPTION OF EXEMPLARY EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art. For example, it will be understood that the present invention finds application to any packet switched network, such as an Asynchronous Transfer Mode (ATM) network and an Internet protocol (IP) network, and to other spread spectrum systems such as CDMA2000 systems.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile station and remote station are synonymous and describe a remote user of wireless resources in a wireless communication network.

The method of controlling downlink transmission timing in accordance with the exemplary embodiments of the present invention may include four functional states at the RNC: initialization, synchronization, outage detection, and outage recovery. The initialization state may include setting up an initial sending time based on the Iu downlink total delay, and based on a turning back (retarding) of the target sending time from the Timing Adjustment procedure, which in turn is based on downlink total delay. The synchronization state may be referred to as a state of information measure at RNC, e.g., a state where the RW may be determined for each frame to be received. An outage detection state is a state of detecting an outage of frame arrival time (i.e., a time that is outside the RW). The outage recovery state is a state where the RNC may send feedback to the CN to adjust the sending time, in an effort to recover from an outage situation.

Figure 1:
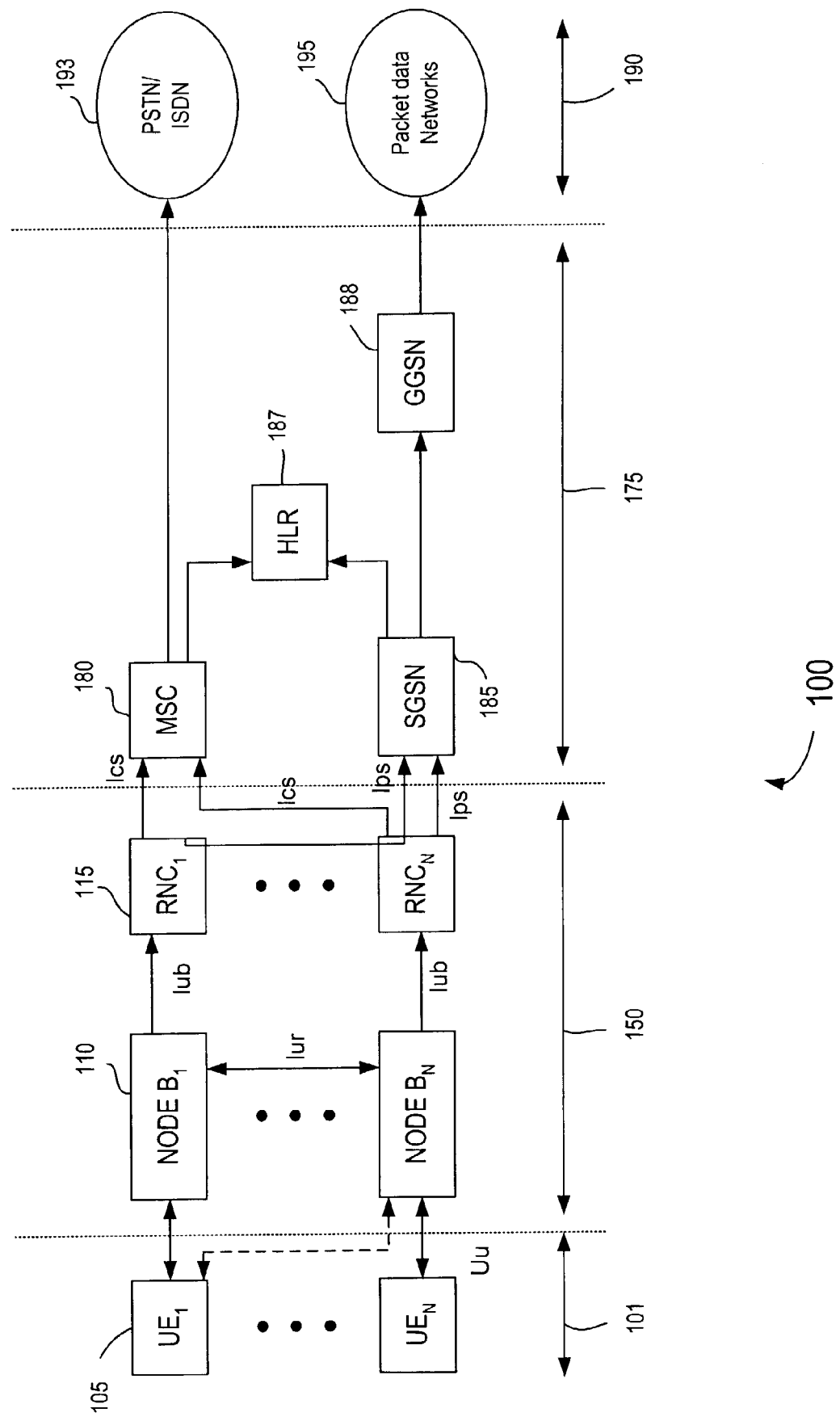
FIG. 1 illustrates a high-level diagram of the UMTS architecture, in accordance with an exemplary embodiment of the invention.

FIG. 1 illustrates a high-level diagram of the UMTS architecture, in accordance with an exemplary embodiment of the invention. Referring to FIG. 1, a UMTS architecture 100 comprises a radio access network part that may be referred to as a UMTS terrestrial radio access network (UTRAN) 150. The UTRAN 150 interfaces over a Uu air interface with a radio interface part 101; namely user equipments (UEs) such as mobile stations. The Uu air interface is the radio interface between the UTRAN 150 and one or more UEs 105. The UTRAN 150 also interfaces with one or more core networks (CNs) 175 (only one being shown in FIG. 1 for simplicity) via interfaces Ics and Ips, for example. Ics, short for Interface Unit (Circuit Switched) interface, is the interface in UMTS which links the RNC with a Mobile Switching Center (MSC). Ips, short for Interface Unit (Packet Switched) interface, is the interface in UMTS which links the RNC with a Serving GPRS Support Node (SGSN). The Uu air interface enables interconnection of Node Bs with UEs, for example.

CN 175 may include mobile switching centers (MSCs) 180, SGSNs 185 and Gateway GPRS serving/support nodes (GGSNs) 188. SGSN 185 and GGSN 188 are gateways to external networks 190. In general in UMTS, SGSNs and GGSNs exchange packets with mobile stations over the UTRAN, and also exchange packets with other internet protocol (IP) networks, referred to herein as "packet data networks". External networks 190 may include various circuit networks 193 such as a packet Switched Telephone Network (PSTN) or Integrated Service Digital Network (ISDN) and packet data networks 195. UTRAN 150 may also be linked to the CN 175 via back-haul facilities (not shown) such as T1/E1, STM-x, etc., for example.

The UTRAN 150 may include cell sites, called Node Bs 110, which may serve a group of UEs 105, generally using a Uu interface protocol. A Node B 110 may contain radio transceivers that communicate using Iub protocol with radio network controllers (RNCs) 115 in UTRAN 150. RNCs 115 within UTRAN 150 may communicate with each other using an Iur protocol, for example. The Iur air interface is a subset of the Iu interface that enables interconnection of RNCs with each other. Several Node Bs 110 may interface with a single RNC 115 where, in additional to call setup and control activity, tasks such as radio resource management and frame selection in soft handoff may be carried out. Node Bs 110 and RNCs 115 may be connected via links that use ATM-based packet transport, for example.

In general, the exemplary embodiments of the present invention provide timing control of downlink sending time to meet a target transmission time of the radio link, in an effort to reduce total transmission delay in a UTRAN such as UTRAN 150, for example, to recover from a landline out-of-sync state, and to assure a target QoS, etc. The exemplary embodiments may incorporate a timing control algorithm (referred to as a "Timing Adjustment procedure") which adjusts the RNC 115 sending time of a downlink data frame to a Node B 110 within the framework specified in the UMTS standard. The Timing Adjustment procedure, which is discussed in further detail below, is defined by the 3rd Generation Partnership Project Technical Specification entitled "Synchronisation in UTRAN Stage 2 (Release 5)"; 3GPP TS 25.402, V5.1.0 (June 2002).

The Timing Adjustment procedure in TS 25.402 incorporates a step adjust to adapt Iub time variation based on feedback of an "outage" from the Node B 110. In other words, the step adjust adjusts the transmission time of transmitting a data frame from the RNC 115 to a Node B 110 in the Iub interface (the Iub air interface is a subset of the Iu interface that enables interconnection of RNCs with Node B's). An outage may be defined as a situation where a downlink data frame is to be received outside of an arrival window (too early or too late). In the Timing Adjustment procedure, an arrival window represents a time difference between (a) a time at which a downlink data frame arrives at the Node B 110 from the RNC 115 in the Iub, and (b) a specified time after which the downlink data frame arrived at the Node B in the Iub. In other words, the arrival window is a window of time spanning a given amount of milliseconds between time point (a) and time point (b). The method in accordance with the exemplary embodiments observes control responses at the RNC 115 from the Time Adjustment procedure at each leg during soft handover, and may adapt the sending time of the downlink data frame from the core network to meet the demand of all legs.

Timing Adjustment Procedure.

A timing adjustment procedure adjusts the RNC 115 sending time of a downlink data frame to a Node B 110 within the framework specified in the UMTS standard. The timing adjustment procedure in accordance with the UMTS standard (TS 25.402) is briefly described in order to provide context for the exemplary embodiments of the present invention. One synchronization concern in UTRAN 150 is transport channel (TrCH) synchronization. An example of a scenario addressed by transport channel synchronization is related to the time of arrival of a downlink data frames sent over a TrCH from a serving RNC 115 (SRNC) to Node B 110. An early arrival of the data frame from the SRNC 115 has the potential of causing a buffer overflow at the Node B 110. A late arrival of the DL data frame from the SRNC 115 may cause the frame to be dropped or discarded at the Node B 110. Late arrival means that the data frame arrives later than a target processing time of the data frame (e.g., a latest time of arrival) at the Node B 110.

To address the above downlink transmission timing concerns from the SRNC 115 to Node B 110, the timing adjustment procedure may be used to maintain the synchronization of a dedicated channel (DCH) data stream in the downlink direction, i.e., to ensure that the Node B 110 receives the downlink data frames in an appropriate time for the transmission of the data in the air interface to the UEs 105. In other words, the procedure may be used to indicate, to the SRNC 115, an incorrect arrival time of downlink data frames to the Node B 110.

A SRNC includes a Connection Frame Number (CFN) in all downlink data frames and in all downlink signaling control frames. If a downlink data frame or a downlink signaling control frame arrives outside an arrival window defined in the Node B, the Node B sends a timing adjustment control frame to the SRNC, containing a measured time of arrival and the CFN value of the received downlink data frame. In response to the timing adjustment control frame, the SRNC will adjust target sending time of the downlink data frame forward or backward.

Figure 2:
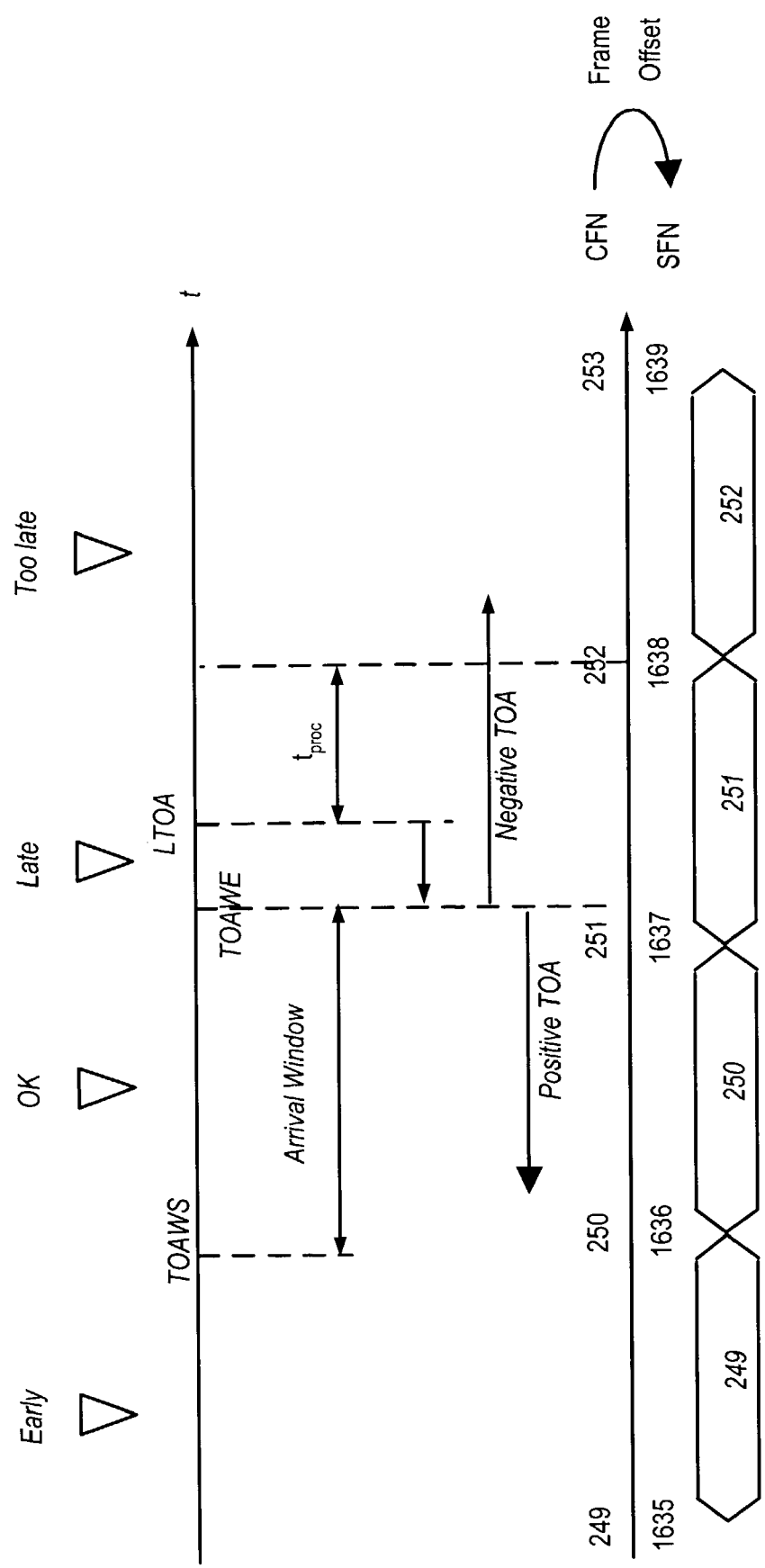
FIG. 2 illustrates a timing adjustment procedure in accordance with an exemplary embodiment of the invention.

FIG. 2 illustrates a timing adjustment procedure in accordance with an exemplary embodiment of the invention. Referring to FIG. 2, an arrival window and a time of arrival may be defined by a Time of Arrival Window Endpoint (TOAWE), a Time of Arrival Window Startpoint (TOAWS) and a Time of Arrival (TOA). The TOAWE represents the time point at which the downlink data frame arrives at the Node B in the Iub interface conveying information between SRNC and Node B. The TOAWE may be defined as the amount of milliseconds before the last time point from which a timely downlink transmission for the identified CFN would still be possible, taking into account Node B internal delays. If data does not arrive before TOAWE, a timing adjustment control frame may be sent by the Node B to the SRNC. The TOAWS represents the time after which the downlink data frames (illustrated as downlink (DL) Radio Frames 249-252 in FIG. 2) arrives at the Node B in the Iub.

The TOAWS may be defined as the amount of milliseconds from the TOAWE. If a data frame arrives before TOAWS, a timing adjustment control frame may be sent by the Node B to the SRNC.

In FIG. 2, the TOA is the time difference between the end point of the downlink arrival window (TOAWE) and the actual arrival time of the downlink data frame for a specific CFN. A "positive TOA" means that the data frame is received before the TOAWE, and a "negative TOA" means that the data frame is received after the TOAWE. $T_{proc}$ represents processing time before transmission of the downlink data frame by the SRNC to the Node B. In FIG. 2, only DL radio frame 250 is within the arrival window, with DL radio frames 251 and 252 late, and DL radio frame 249 early.

Timing Alignment.

The timing adjustment procedure described above provides timing control between transmitting a data frame in the downlink for the RNC 115 to the Node B 110. The exemplary embodiments of the present invention are directed to a method of controlling downlink transmission timing from the CN 175 to the RNCs 115 in the UTRAN 150. The method of controlling downlink transmission timing uses a time alignment procedure that incorporates the timing adjustment procedure described above for controlling when a downlink transmission is to be transmitted from the CN 175 to the RNC 115, and also for controlling buffer capacity of the RNC 115.

The method of controlling downlink transmission timing from the CN 175 to the RNCs 115 includes a Relative Window (RW) timing control mechanism. The RW timing control mechanism may be designed to measure a RW, which may be defined as a time difference at the RNC 115 between a downlink (DL) data frame arrival from the CN 175, in particular from MSC 180 of CN 175, and a target processing time ($t_{target}$) for sending the DL data frame to the Node B 110. The target processing time $t_{target}$ may be the target sending time to the Node B as specified by the Iub protocol, for example. The RW may be generally defined by expression (1):

$$RW = t_{target} - t_{rec} = t_{send} - t_{proc} - t_{rec}. \quad (1)$$

In expression (1), $t_{rec}$ is the actual time that the DL data frame arrives at the RNC 115 from the MSC 180 of the CN 175. The time $t_{send}$ is the target sending time of the DL data frame from the RNC 115 to the Node B 110. The target sending time $t_{send}$ is set by the timing adjustment procedure. The time $t_{proc}$ represents processing time before transmission of the DL data frame from the RNC 115 to the Node B 110, which may include data framing to Iub protocol and data duplication for handover. Thus, $t_{target}$ is the latest time for the RNC 115 to process a received DL data frame in order to meet the target sending time to the Node B 110 (e.g., $t_{send} - t_{proc}$).

The $t_{target}$ may also be considered as the latest possible time of DL data frame arrival at the Node B 110 such that the Node B can still transmit the DL data frame to the UEs 105. This time is called the Latest Time of Arrival (LTOA). In the current standard, the DL data frame will be dropped by the Node B 110 if the frame arrives later than LTOA. The $t_{proc}$ may be considered a deterministic variable, which excludes queueing delay encountered by the data buffering, when a common transport channel is set up. As will be described in further detail, the $t_{send}$ may change based on a timing control mechanism (e.g., determination or measure of RW), that may adapt Iub delay variation.

Further, a receiving time of a DL data frame from the MSC 180 (i.e., $t_{rec}$) may vary subject to the variation of the Iu link condition, for example, and may vary subject to the traffic generated from transcoder output of a transcoder in MSC 180. The above dynamics related to the sending time ($t_{send}$) and the receiving time ($t_{rec}$) in the RW determination may reflect a delay variation from both Iub and Iu links at the RNC 115.

Figure 3:
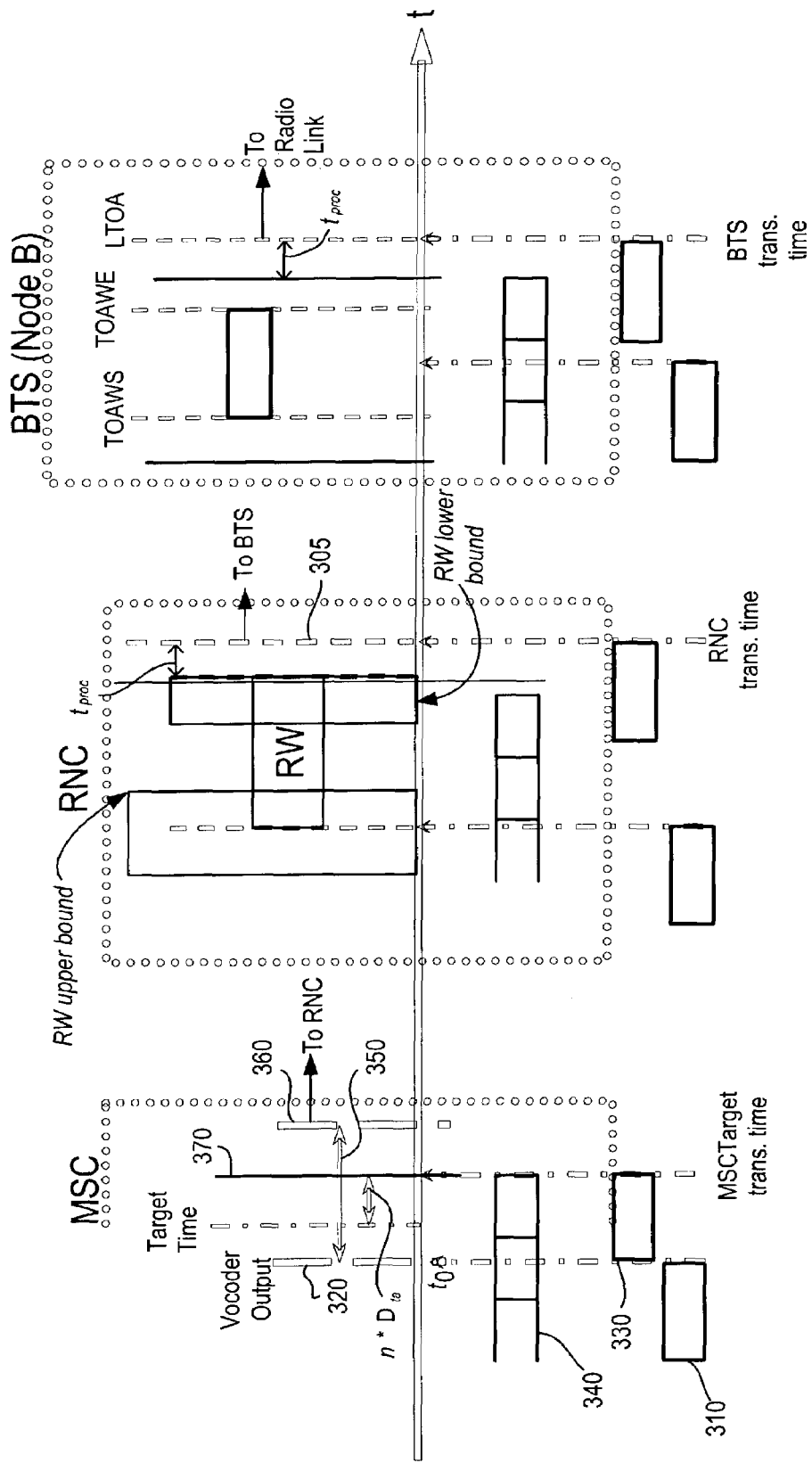
FIG. 3 is a timing diagram illustrating data flow in accordance with an exemplary embodiment of the invention.

FIG. 3 is a timing diagram illustrating data flow in accordance with an exemplary embodiment of the invention. Using information flow in time coordinates, the timing control in accordance with the exemplary embodiments of the invention is described. Referring now to FIG. 3, the time $n*D_{ta}$ may represent an n-step transmission time adjustment at the CN 175 (based on the timing adjustment procedure) with step size $D_{ta}$, for example. The step adjust is what adjusts the transmission timing at which a DL data frame is transmitted form the RNC 115 to the Node B 110. The time the DL data frame is targeted for transmission from the RNC 115 to the Node B 110 is represented by element 305. The DL data frame is received in a designated window of time. Element 310 In FIG. 3, a completion time 310 of a transcoder packet (voice or video-required transcoding) output, and a time 320 ($t_0$) that represents the actual time of the transcoder output is shown. Completion time 330 represents a completion time of packet reading out from the buffer of MSC 180 to send the DL data packet at the scheduled MSC target transmission time. Element 340 may represent the buffer at the MSC 180 adjusting the time of transmission from the MSC 180 to the RNC 115. A maximum time interval 350 that could be adjusted for transmitting the DL data frame is also shown in FIG. 3, as is a latest time 360 that the DL data frame could be sent from MSC 180 to the RNC 115. The MSC target transmission time to reach the RNC 115 within the RW is indicated at 370. This MSC target transmission time may be set based on feedback from the RNC 115, as will be further described below.

The RW determination may provide an index to compare with provisional threshold values (referred to hereafter as "boundary thresholds") for outage detection. The boundary thresholds defined for outage detection may be referred to as a Relative Window Upper Bound (RWUB) and a Relative Window Lower Bound (RWLB). The RWUB may be further defined as the threshold for a DL data frame early arrival. If not accounted for, an early arrival of the DL data frame from the MSC 180 may cause a buffer overflow at the RNC 115. The RWLB may be further defined as the threshold for a DL data frame late arrival. The late arrival of the frame from the MSC 180 could cause RNC 115 to drop, or discard the DL data frame, since the frame arrives later than the target processing time (i.e., $t_{target}$ or LTOA).

An outage condition for multiple transport channels may be defined as any one of the multiple transport channels exceeding one of the boundary thresholds (RWUB and RWLB). It is possible that DL data frame arrival time from MSC 180 to RNC 115 may be "relative late" to one transport channel, and "relative early" to other transport channels during diversity handover. Accordingly, one determined RW may be smaller than the RWLB, and other determined RWs may be larger than the RWUB.

Accordingly, the exemplary embodiments include strategies for joint outage detection and accurate outage recovery at the RNC 115 for a multiple transport channel scenario. For example, the RW may be further characterized by a Maximum Relative Window (MaxRW) and a Minimum Relative Window (MinRW), which may be defined as the maximum and minimum of all RW measurements, respectively, that are associated with a transport service. These may be defined by expression (2):

$$\text{Max } RW = \max_i (RW_i, i = 1, 2, \ldots N) \quad (2)$$

$$\text{Min } RW = \min_i (RW_i, i = 1, 2, \ldots N).$$

In expression (2), for each $i^{th}$ TrCH up to N TrCHs, MinRW may denote the smallest margin difference between the receiving time from the MSC 180 and the target processing time (LTOA) among all transport channels. If the MinRW is smaller than the RWLB, the received DL data frame for the specific transport channel could arrive relatively late at the RNC 115, potentially resulting in frame dropping. The outage may be detected even though the DL data frame arrival time at the RNC 115 is with the normal range relative to other transport channels, i.e., within the RW between the boundary thresholds RWUB and RWLB. If the MinRW is larger than the RWUB, all RW determination are larger than the RWUB. The outage condition is thus detected as the DL data frame arrives too early.

For the multiple transport channel scenario, the MinRW serves as a reference index for outage detection. The MaxRW may be used as a measure indicating a largest margin between the receiving time ($t_{rec}$) and the latest time of arrival (LTOA), i.e., the latest time that a data frame has to be at the Node B 110 in order to transmit to the UEs 1205. The MaxRW may also provide an indication of buffer overflow in the UTRAN 150. Any DL data frame arriving at the RNC 115 earlier than the target processing time (LTOA) is buffered. Accordingly, the timing alignment procedure may be general characterized as follows: if a DL data frame arrives at RNC 115 early, and a required buffering time is larger than the designed buffer size for the RNC 115, the buffer is overflowed. Accordingly, the RNC 115 will send a request to retard the sending time from the MSC 180, to prevent the buffer overflow for the next frame arrival at the RNC 115. Conversely, it should be understood that if a DL data frame arrives at RNC 115 late, the RNC 115 will send a request to advance the sending time from the MSC 180, to prevent discarding the next received DL data frame at the RNC 115.

Figure 4:
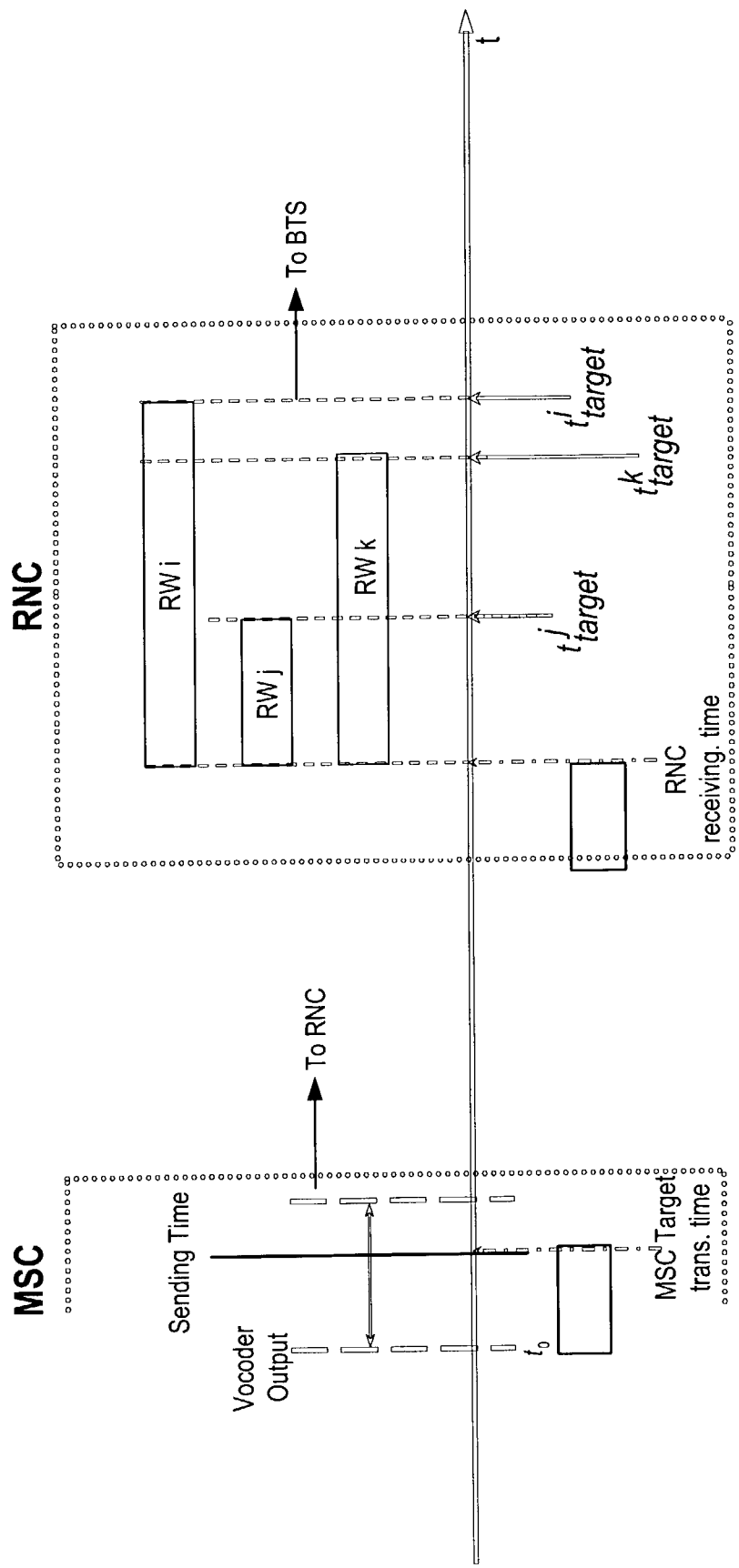
FIG. 4 is a timing diagram illustrating relative window determination in accordance with an exemplary embodiment of the invention.

FIG. 4 is a timing diagram illustrating relative window determination in accordance with an exemplary embodiment of the invention. During diversity handover, multiple transport channels (TrCHs) may be established for a transport service at the RNC 115 to interconnect to the Node Bs 110. One TrCH may be set up to associate with one Node B connection. Each TrCH may have its own timing control mechanism. Henceforth, there may be multiple RW measures (determinations) during diversity handover.

Referring to FIG. 4, information flow in time-coordinate with respect to three transport channels arranged for a transport service is shown, to illustrate the above details with further clarity. FIG. 4 shows an RNC having three Iub connections to three Node B's (i, j, k) during soft handover. Each Iub connection has its own independent time adjustment procedure. Three target sending times, $t^i_{target}$, $t^j_{target}$ and $t^k_{target}$ may be set, with each target sending time corresponding to a respective Iub connection. Since each Iub connection has its own time adjustment procedure, there are three corresponding RW measures, namely $RW_i$, $RW_j$, and $RW_k$. The reference indices MinRW and MaxRW for outage detection are $RW_j$ and $RW_i$, respectively, at the times shown in FIG. 4. Reference indices $RW_j$ and $RW_i$ may be used for comparison to provisioned system parameters (e.g., boundary thresholds RWLB and RWUB) for outage detection, for example.

The time alignment method in accordance with the exemplary embodiments may include four functional states at the RNC: initialization, synchronization, outage detection, and outage recovery. These are now described in further detail below.

A. Initialization.

For initialization, RNC 115 may retrieve provisional system parameters RWUB and RWLB, and the required office data $T_{ta}$ which is a measure of the delay between when the RNC 115 sends a request to the MSC 180 and the time at which the MSC 180's response to the request is received at the RNC 115.

The boundary thresholds and office data $T_{ta}$ are set in the system during system set up. However, the boundary thresholds may be dynamically changed based on the amount of delay in the system, as evidenced by $T_{ta}$. A supervisor timer at the RNC 115 initiates a supervision time $T_{ta}$ to supervise the time alignment procedure. The $T_{ta}$ starts when an "initiate Time Alignment frame" is from the RNC 115 to the MSC 180 sent and stops when an Acknowledgement (ACK) or Negative Acknowledgement (NACK) is received by the RNC 115. $T_{ta}$ may increase if there are multiple hops between the MSC 180 and RNC 115, thus causing DL data frames to arrive late (outside the RWUB). Thus, $T_{ta}$ should be designed to align with the RWUB, because $T_{ta}$ is a timer supervising signaling messages corresponding to the total buffer size design of the UTRAN 150. Thus, the RWUB is set proportional to the buffer size design during system set up.

B. Synchronization.

For synchronization, the RNC 115 measures the RW every time a DL data frame is received from MSC 180. The MinRW and MaxRW may be set for the following scenarios:

(a) One transport channel scenario—

$$\text{MinRW} = \text{MaxRW} = \text{RW} \quad (3)$$

(b) Multiple transport channel scenario—

$$\text{Min } RW = \min_i (RW_i, i = 1, 2, \ldots, N) \quad (4)$$

$$\text{Max } RW = \max_i (RW_i, i = 1, 2, \ldots, N).$$

In expressions (3) and (4), MinRW and MaxRW may be set for frames received on multiple Iub link connections during soft-handover. Multiple Iub connections may be set in soft-handover. Each DL data frame arriving at the RNC 115 may be duplicated and sent to each Node B that is part of the soft-handover. Each Iub link therefore needs to be synchronized; thus each Node B 110 has an independent timing adjustment procedure running. Accordingly, since each Iub link may have its own targeted downlink transmission time set at the RNC 115 during the soft handover, each downlink target transmission time for a particularly DL data frame has its own RW measure. MinRW and MaxRW may be defined as the reference measures in the time alignment procedure in accordance with the exemplary embodiments.

C. Outage Detection.

MinRW may be used as the reference index for outage detection, in both single transport channel and multiple transport channel scenario. The outage condition could be defined in the following scenarios in expressions (5) and (6):

$$MinRW \leq RWLB$$

$$MinRW \geq RWUB \quad (5)$$

Expression (3) represents a "conservative" scheme. The MinRW may be used as a referential measure of outage detection. Comparing the MinRW to the RWUB as an earlier arrival check ensures that the arrival of a DL data frame is early for all connections. Since the outage detection of early arrival is based on the outage detection strategy for all links, this scheme would avoid frequent requests for timing alignment from the RNC 115 due to early arrival of the DL data frame.

$$MinRW \leq RWLB$$

$$MaxRW \geq RWUB \quad (6)$$

Expression (6) represents a more "aggressive" scheme, where time alignment feedback may be sent to MSC 180, with the early arrival being determined if any of the connection considers the arrival is early (MaxRW>RWUB). This scheme has the advantage of reducing the buffer requirement because the triggering point is tight and based on the RWUB at the RNC 115.

D. Outage Recovery.

Upon detecting an outage based on the MinRW, the MaxRW may be used as a reference to prevent buffer overflow in an outage recovery process. The outage recovery process may be described as follows for the conservative and aggressive schemes:

(i) Conservative
  (A) If MinRW≦RWLB is detected: two possible actions may occur:
    1. Direct reaction: RNC 115 sends feedback to the MSC 180 to advance the sending time Δ.
    2. Incorporated reaction: The reaction would depend on a check of relative arrival time of other legs of connection to avoid further buffer overflow.
      If MaxRW≧RWUB, no action is taken
      If MaxRW<RWUB, RNC 115 sends feedback to the MSC 180 to advance the sending time Δ.
  (B) If MinRW≧RWUB is detected, RNC 115 sends feedback to the MSC 180 to retard the sending time Δ.

The feedback may be embodied as a Time Alignment Information Element (IE) in the Iu UP Frame Protocol Type 14, for example, although the present invention is not limited to using an IE, or the aforementioned Iu protocol to convey the feedback to MSC 180. The parameter Δ represents an adjust step requested by the Timing Alignment procedure. The adjust step (Δ) may be determined based on the Iu link condition and on real time source codec characteristics, such as PCM-AMR transcoding, for example.

(ii) Aggressive
  (A) If MinRW≦RWLB is detected: two possible actions same as those for the conservative scheme.
  (B) If MaxRW≧RWUB is detected: two possible actions may be:
    1. Direct reaction: RNC sends a feedback to the MSC 180 to retard the sending time Δ.
    2. Incorporated reaction: The reaction would depend on a check of relative arrival time of other legs of connection to avoid further DL data frame dropping.
      If MinRW≦RWLB, no action is taken to prevent any cause of late arrival to other leg of connection.
      If MinRW>RWLB, RNC sends a feedback to the MSC 180 to retard the sending time Δ.

The adjust step (Δ) may be determined based on the Iu link condition and on real time source codec characteristics, such as PCM-AMR transcoding, for example.

Accordingly, the exemplary embodiments of the present invention provide a method of controlling downlink transmission timing, where a RW for DL Time Alignment is a measure of a difference between the frame arrival time of a DL data frame and the target sending time set by the Timing Adjustment procedure of TS 25.402. During handover, each RNC-Node B transport channel may have its own timing control mechanism. MaxRW and MinRW measurements may be defined as the maximum and minimum of all RWs associated with a transport service using one or more transport channels to convey the DL frame data. MinRW may be used as a reference index to compare to defined boundary thresholds RWUB and RWLB for outage detection, and an outage recovery process may be configured to control transmission timing for sending the DL data frame from the CN 175 (e.g., MSC 180) to the UTRAN 150 (e.g., RNC 1165). Further, MaxRW may be embodied as a utility to prevent buffer overflow at the RNC 115 during the outage recovery process.

The exemplary embodiments of the invention being thus described, it will be obvious that the same may be varied in many ways. Such variations are not to be regarded as departure from the spirit and scope of the exemplary embodiments of the invention, and all such modifications as would be obvious to one skilled in the art are intended to be included within the scope of the following claims.

What is claimed is:

1. A method of controlling downlink transmission timing at a radio network controller (RNC) in a communication system, comprising:
    determining a relative window (RW) in which to receive a data frame at the RNC, the RW being a time difference between a time of arrival of the data frame at the RNC and a target transmission time for transmitting the data frame from the RNC; and
    transmitting the frame within the RW.

2. The method of claim 1, further comprising initializing the RNC for controlling downlink transmission timing.

3. The method of claim 2, wherein said initializing includes:
    transmitting a time alignment control frame;
    starting a supervision timer for supervising receipt of a response to the time alignment control frame; and
    retrieving boundary thresholds of the relative window for to a received data frame.

4. The method of claim 1, wherein said determining includes setting a minimum relative window (MinRW) and a maximum relative window (MaxRW) for each received data frame, so that the MinRW equals the MaxRW, which equals the RW, for a data frame received on a single transport channel.

5. The method of claim 1, wherein said determining includes setting a minimum relative window (MinRW) and a maximum relative window (MaxRW) for each received data frame by a relation:

$$MinRW = min(RW_i, i=1, 2, \ldots N), \text{ and}$$

$$MaxRW = max(RW_i, i=1, 2, \ldots N)$$

for data frames received on i to N transport channels.

6. The method of claim 1, wherein said determining includes setting a minimum relative window (MinRW) and a maximum relative window (MaxRW) for each received data frame, the method further comprising:
retrieving boundary thresholds to be used for said determined RW, said boundary thresholds comprised of a relative window upper bound (RWUB) and a relative window lower bound (RWLB); and
detecting an outage condition where a received data frame is outside one of the boundary thresholds.

7. The method of claim 6, wherein said detecting includes detecting that the received data frame is outside the boundary thresholds if the MinRW is less than or equal to the RWLB, or the MinRW is equal to or exceeds the RWUB.

8. The method of claim 7, further comprising:
signaling a core network that is to transmit the data frame to advance a time of transmission of the data frame to the RNC, if the MinRW is less than or equal to RWLB.

9. The method of claim 7, further comprising:
checking relative arrival times of data frames on other connections at the RNC, if the MinRW is less than or equal to RWLB; and
signaling a core network that is to transmit the data frame to advance a time of transmission of the frame to the RNC, if the MaxRW is less than the RWLB.

10. The method of claim 7, further comprising:
signaling a core network that is to transmit the data frame to retard a time of transmission of the data frame to the RNC, if the MinRW equals or exceeds the RWUB.

11. The method of claim 7, wherein said transmitting includes transmitting the data frame to one or more base transceiver stations at a target transmission time within the RW, if the data frame is detected as received within the boundary thresholds.

12. The method of claim 7, wherein said detecting includes detecting that a received data frame is outside the boundary thresholds if the MinRW is less than or equal to the RWLB or the MaxRW equals or exceeds the RWUB.

13. The method of claim 12, further comprising:
signaling a core network that is to transmit the data frame to advance a time of transmission of the data frame to the RNC, if the MinRW is less than or equal to the RWLB.

14. The method of claim 12, further comprising:
checking relative arrival times of data frames on other connections at the RNC, if the MinRW is less than or equal to the RWLB; and
signaling a core network that is to transmit the data frame to advance a time of transmission of the data frame to the RNC, if the MaxRW is less than the RWLB.

15. The method of claim 14, further comprising:
signaling a core network that is to transmit the data frame to retard a time of transmission of the data frame to the RNC, if MinRW equals or exceeds the RWUB.

16. The method of claim 14, further comprising:
checking relative arrival times of data frames on other connections at the RNC, if MaxRW equals or exceeds the RWUB; and
signaling a core network that is to transmit the data frame to retard a time of transmission of the data frame to the RNC, if the MinRW exceeds the RWLB.

17. The method of claim 13, wherein said transmitting includes transmitting the data frame to one or more base transceiver stations at a target transmission time within the RW, if the data frame is detected so as to be received within the thresholds.

18. A method of controlling downlink transmission timing at a radio network controller (RNC) in a communication system, comprising:
determining a relative window (RW) in which to receive a data frame, the RW representing a time difference between a time of arrival of the data frame at the RNC and a target transmission time for transmitting the data frame from the RNC, the relative window further composed of a minimum relative window (MinRW) and a maximum relative window (MaxRW) that is set for each data frame to be received;
setting an upper threshold and a lower threshold that adjoin the RW;
detecting whether a received data frame is outside one of the lower and upper thresholds of the RW; and
transmitting the data frame when it is within the RW.

* * * * *